June 13, 1933.  W. H. CHAPMAN  1,914,110
METHOD OF AND APPARATUS FOR NEUTRALIZING STATIC ELECTRICITY
Filed Jan. 11, 1932   2 Sheets-Sheet 1
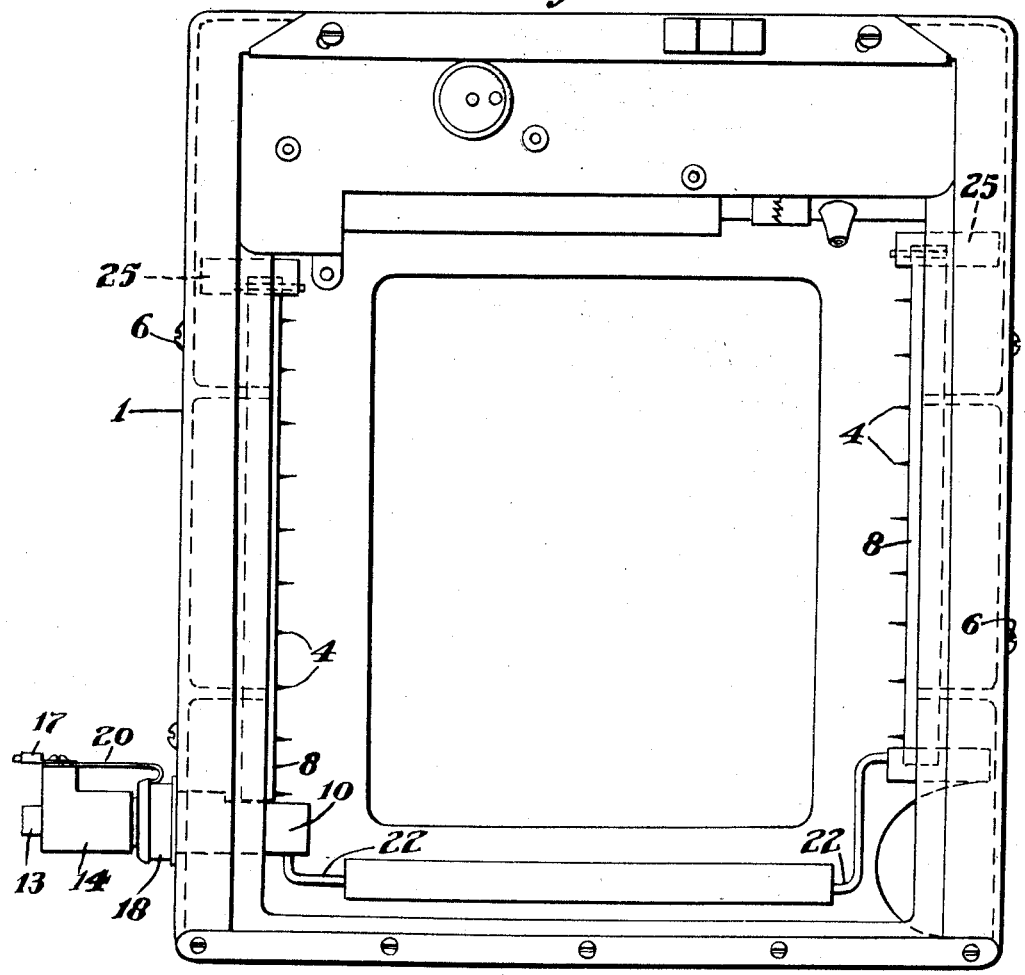
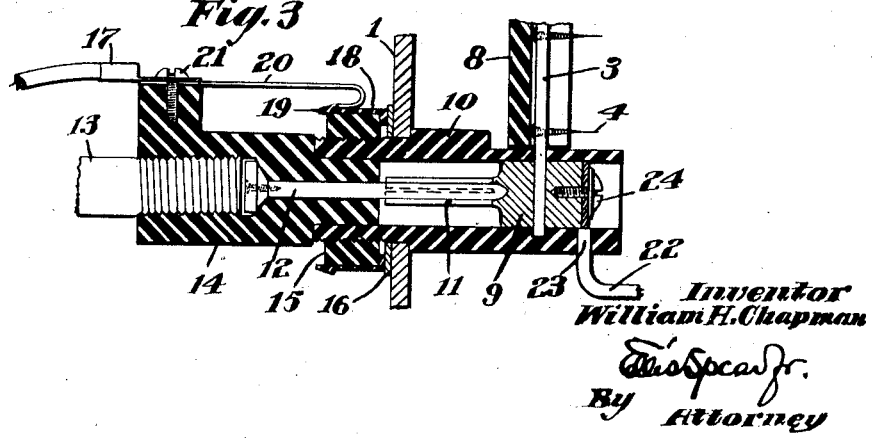
Inventor
William H. Chapman
By Attorney

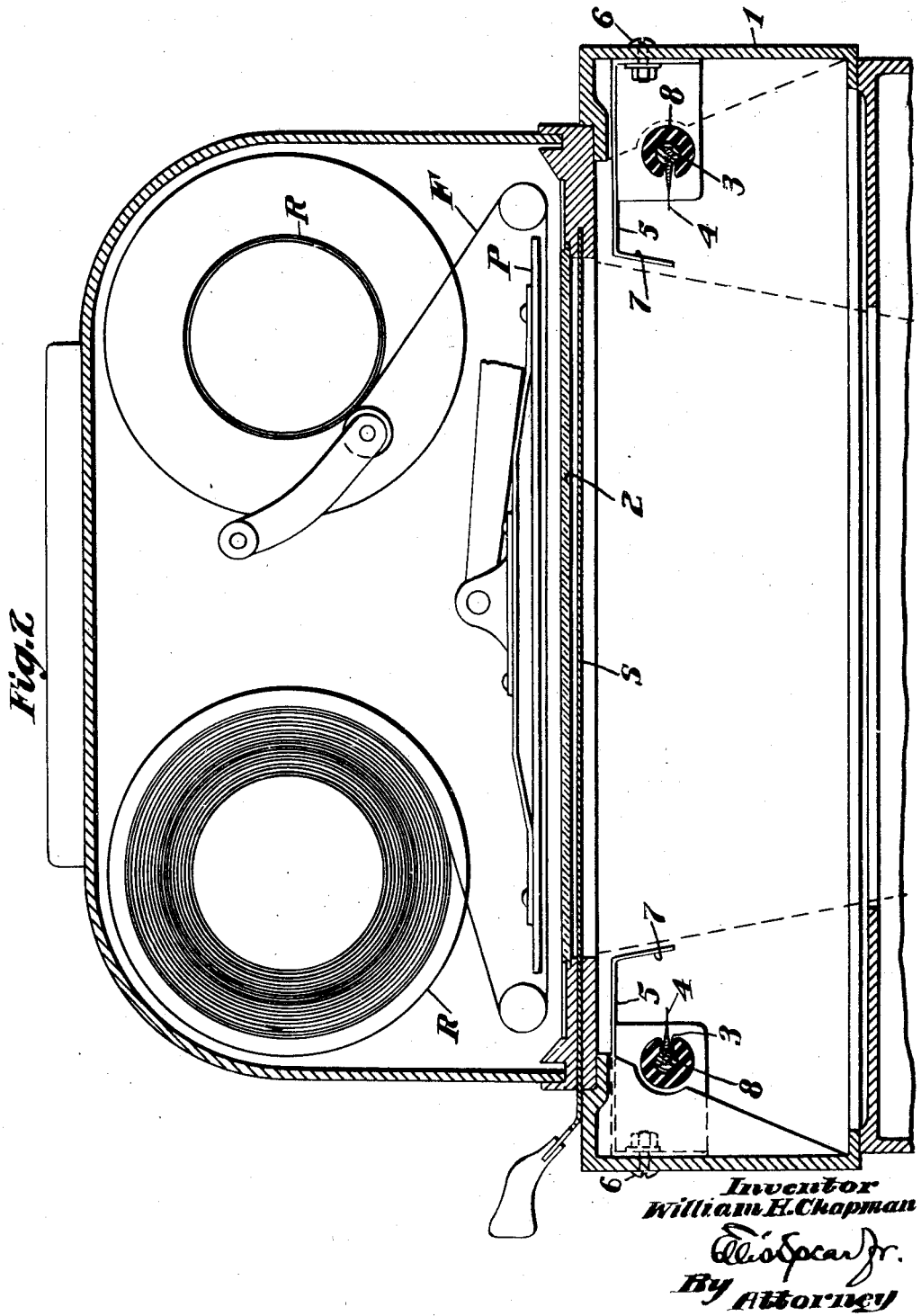

Patented June 13, 1933

1,914,110

UNITED STATES PATENT OFFICE

WILLIAM HENRY CHAPMAN, OF PORTLAND, MAINE, ASSIGNOR TO CHAPMAN ELECTRIC NEUTRALIZER COMPANY, OF PORTLAND, MAINE, A CORPORATION OF MAINE

METHOD OF AND APPARATUS FOR NEUTRALIZING STATIC ELECTRICITY

Application filed January 11, 1932. Serial No. 585,958.

The presence of static electricity on sheets or plates of material which are capable of assuming the static charge has long been a source of difficulty in apparatus involving the use of such material, as for example, in cameras, and particularly in those types of cameras where the film is in motion and in contact with some part of the camera, as for example, the contact glass of the camera, and hence imparts a static charge to such glass. The problem of neutralizing such static charge on the contact glass, and thereby preventing spoilage of the film, has long baffled all efforts to overcome it. This is especially true of the so-called aerial survey camera which is mounted in an aeroplane and used for the purpose of making photographs from the air. With such a camera the problem is particularly acute, due to the limitations surrounding the use of the camera in an aeroplane.

For the purposes of this application therefore I shall discuss my present invention in its adaptation to a camera for aerial photography. It is to be understood, however, that such treatment is purely illustrative and that the principles of my invention are not limited to such use alone, but may be applied to any camera or projector wherein the sensitized film is in motion and consequently develops a charge of static electricity either on itself or on other insulating material with which it comes in contact.

In the case of the aerial survey camera, such charge results from the friction set up by the travel of the film between the usual pressure plate of the camera and the usual contact glass covering the sight opening of the camera. Static on the glass plate discharges onto and spoils the film by causing it to become streaky or befogged, and since the cost of the film alone is a considerable item of expense in procuring any photograph, the importance of preventing the static or neutralizing its action is evident. Where the camera is an aerial camera, moreover, the item of film cost, while considerable in itself, is relatively insignificant in comparison with the matter of cost for using the aeroplane, not to mention the factor of danger, particularly in time of war.

Various expedients have been devised for eliminating or neutralizing static but none of them has proven satisfactory in an aerial survey camera. This has been largely due to the fact that heretofore all effort has been concentrated on the film itself whereas the undeveloped film is a partial conductor and a charge will not accumulate on it while on the other hand it does accumulate on the glass with which the film comes in contact so that when the film separates from the glass the electricity on the glass jumps in minute sparks to the film, thus spoiling the film.

I have discovered that by producing a conducting or an ionized atmosphere underneath the usual contact glass covering the sight opening of the camera I can so bind by condenser action the charge of static resulting from the friction of the moving film between the pressure plate and glass as to prevent the static with which the glass has been charged from discharging onto the film. In other words instead of attempting to prevent entirely the development of a static charge on the glass or of illuminating such charge entirely after it has been developed, I simply confine on the glass by condenser action any remaining charge in such a manner that it cannot act on the film. That is to say, whatever static charge is present on the glass, according to my invention is so bound on the glass by condenser action as to be harmless on the film, being rendered harmless by the existence of a conducting or an ionized atmosphere deliberately produced at the side of the glass opposite to the side with which the film contacts and hence out of contact with the film itself. In so far as having any effect on the film is concerned, the static charge on the glass, under these conditions, is the same as though it never existed at all. The following simple experiment will readily illustrate this principle.

When a plate of glass is held in the hand and rubbed with a piece of undeveloped camera film with the emulsion side against the glass, a charge of static electricity is generated in the glass of a potential of several thousand volts.

If this be done in a darkened room, sparks may be seen striking from the surface of the glass to the film, as it passes along, because of the fact that the emulsion side of an undeveloped camera film is a partial conductor for charges of the order of a thousand volts or more. If, however, the glass plate is laid down on some conducting surface, or even on an ordinary wooden table, and rubbed, the greatest charge that can be produced in the glass will have a potential of only a few hundred volts and not enough to produce the slightest spark discharge from the glass to the film, because of the fact that the charge in the glass is held in a bound condition.

Now, if instead of the solid conducting surface, or table, I substitute an invisible conducting medium like ionized air, the result is the same and the charge on the glass will be bound or neutralized thereby and prevented from making a spark discharge to the film.

There is a natural limit to the amount of potential that can be produced by friction on the surface of a plate of glass backed by a conducting surface, as the emulsion side of a camera film, or an ionized atmosphere, and that limit is approximately 300 volts for a glass plate $\frac{1}{8}''$ thick. It is greater for thicker glass and less for thinner glass.

The instant the conducting surface is separated from the glass, the potential rises enormously and may become many thousand volts with a separation of only $\frac{1}{16}$ of an inch.

The advantage of ionized air as a binding or neutralizing medium is that it retains such an intimate contact with the surface of the glass.

This is one important elemental principle involved in my invention.

Another principle involved in my present invention is one that makes it feasible to utilize the glow discharge from a series of pointed conductors to ionize the air without having the camera film exposed to the illumination attending the glow discharge, and consequently befogged by such glow discharge.

I have found that when a grounded conductor is placed in proximity to the discharge points, the current of ionized air projected from the points is bent around the grounded conductor. This conductor, however, need not be grounded in the ordinary sense, but simply be connected to one terminal of the high tension coil of a transformer while the discharge points are connected to the other terminal, and it may be of such shape and size as to intercept any light rays coming from the points toward the camera film.

The method of practicing my invention, together with suitable apparatus for carrying out the principles involved, is described and illustrated in the accompanying specification and drawings. The disclosure is directed to an aerial survey camera in which use my invention finds a field of immediate application. In the drawings, however, those parts of the camera not essential to a complete understanding of my invention have been omitted in order that the fundamentals of my invention may not be obscured by unnecessary detailing of non-essentials.

In such drawings:—

Fig. 1 is a top plan view of so much of an aerial survey camera of standard make as is necessary to illustrate the application of my invention thereto, the film magazine of the camera being omitted in this figure.

Fig. 2 is a transverse section through Fig. 1 but showing the film magazine in position, and Fig. 3 is a detail section at the terminal socket and plug by which one of my discharge bars is connected to a suitable source of electrical energy, as a transformer.

I have indicated generally at 1 a portion of the case of an aerial survey camera of standard construction and at 2 the usual contact glass which covers the sight opening of such a camera.

It will be understood that the film F travels intermittently over said glass, being carried on reels R positioned above the glass and being fed automatically from one reel to the other. It will also be understood that such film, at the time of exposure, is pressed flatly against the upper face of the glass by means of the usual intermittently acting pressure plate P between which plate and the glass the film travels when the pressure is relieved, and that the lens and shutter mechanism of the camera is located at some distance beneath said glass.

As previously explained, the friction of the traveling film on the glass 2 imparts a static charge to the glass, which charge I bind on the glass by condenser action by producing a conducting or an ionized atmosphere beneath the glass itself, and out of contact with the film, thus preventing the charge from discharging onto the film.

In accomplishing this I mount one or more discharge bars in that portion 1 of the camera case beneath the glass 2. As here shown I have placed a discharge bar 3 at either side of the case. These bars extend longitudinally of the case with their discharge points 4 disposed substantially horizontal and parallel to but below the general plane of the glass 2. By using two discharge bars so placed the binding rays are enabled more quickly to reach the center of the glass. It will be understood, however, that I may use only one discharge bar is desired, the use of two bars not being the essence of my invention, the essence of my invention consisting in the production by whatever means desired of a conducting or an ionized atmosphere beneath the glass which binds by condenser action the static charge on the glass, thus preventing it from discharging onto the film when in contact with the glass.

In order to prevent any light rays from the glow discharge which emanates from the discharge points 4 when the discharge bars are in operation from befogging the film, I preferably shield the film from such glow by means of the metal grounded light screens or shields 5 shown in Fig. 2. These are attached to and grounded on the metal case of the camera as at 6. Each shield overlies its discharge bar and at its inner end is bent downwardly as at 7, and terminates in a plane substantially opposite the plane of the discharge points 4 but spaced inwardly therefrom. The film is thus shielded from befogging due to glow from the discharge points, the binding rays from such discharge points being bent around the terminal portions 7 of the shields and then proceeding towards the glass.

The method of mounting the discharge bars beneath the glass will necessarily vary according to the particular make of camera in which they are used. With the make of camera shown in these drawings, the arrangement and mounting of the discharge bars may conveniently be as shown in Figs. 1 and 2 and the electrical connection to the transformer or other source of electrical energy, as detailed in Fig. 3.

Referring to this figure, each discharge bar is encased in an insulating tube 8 which is slotted substantially from end to end to permit the discharge points 4 to extend horizontally therethrough at suitably spaced intervals. One end of the discharge bar itself is received in a plug 9 of brass or the like which is mounted within the inner end of an insulating sleeve 10 of bakelite or the like. The brass plug 9 is formed with an expansible socket sleeve 11, here shown as a longitudinally slotted sleeve, adapted to axially receive the socket pin 12 of the outside terminal 13 of a transformer, (not shown) such terminal threading into an internally threaded socket plug 14 fitting the outer end of the bakelite sleeve 10. The sleeve 10 is externally threaded to receive a clamping nut 15 by means of which it is fastened to the metal case 1 of the camera. If desired a brass washer 16 may be interposed between the nut and the case wall.

The inside terminal of the transformer is indicated at 17 and is attached to the socket plug 14, as at 21. This terminal returns the current to the transformer and in order to prevent accidental disengagement thereof I drive onto the nut 15 a retaining ring 18 which is formed with an annular latch portion 19 with which the suitably bent inner end of a spring latch 20 in contact with the terminal 17 is adapted to latch when the parts are connected as shown in Fig. 3. The inside terminal 17 is clamped to the latch 20 by the same screw 21 which fastens the terminal 17 to the plug 14.

The current is carried from the discharge bar 3 at this side of the case to the opposite discharge bar by any suitable wiring connection as at 22, (Fig. 1) such wire being introduced through a hole 23 in the sleeve 10 and being clamped to the plug 9 by means of the screw 24. The opposite end of each discharge bar may be mounted in any suitable insulating bracket 25 (Fig. 1) carried by the case.

From the foregoing it will be evident that I produce at that side of the contact glass 2 opposite the side with which the film contacts an ionizing atmosphere which so binds by condenser action the static charge developed on the glass as to prevent it from discharging onto the film. It will also be evident that I prevent befogging of the film, due to glow discharge, while the discharge bars are in operation.

It will be understood that when the camera is in use the usual slide S which is provided in cameras of this type for the purpose of protecting the film until the camera is to be put into operation, is withdrawn from beneath the glass so as to permit the film to be exposed whenever the shutter of the camera is opened.

Various modifications in method and apparatus according to the particular type of camera to be protected, may obviously be made within the spirit and scope of my invention as defined by the appended claims.

What I therefore claim and desire to secure by Letters Patent is:—

1. The method of preventing a static charge from acting on a sensitized film passing through a camera which consists in producing a conducting atmosphere at one side of the usual contact glass over the opposite side of which the film passes and binding the charge by condenser action on the glass thereby preventing it from discharging onto the film.

2. The method of preventing a static charge from acting on a sensitized film passing through a camera which consists in producing an electrically ionized atmosphere at one side of the usual contact glass over the opposite side of which the film passes and binding the charge by condenser action on the glass thereby preventing it from discharging onto the film.

3. The method of preventing a static charge from acting on a sensitized film passing through a camera which consists in producing a glow discharge at one side of the usual contact glass of the camera over the opposite side of which the film passes whereby to create an electrically ionized atmosphere adjacent said glass and binding the charge on the glass by condenser action to prevent it from discharging onto the film.

4. The method of preventing a static charge from acting on a sensitized film passing through a camera which consists in producing a glow discharge at one side of the usual contact glass of the camera over the opposite side of which the film passes whereby to create an electrically ionized atmosphere adjacent said glass which binds the charge on the glass by condenser action and prevents it from discharging onto the film, and in shielding the film from the light rays of the glow discharge so as to prevent befogging of the film.

5. Apparatus for preventing static charge from acting on a sensitized film passing through a camera comprising in combination with the usual contact glass over which the film travels, a discharge bar having a plurality of discharge points disposed at the opposite side of the glass from the side over which the film travels and effective to produce an ionized atmosphere at said opposite side of the glass which binds the static charge on the glass by condenser action and prevents it from discharging onto the film, and means shielding the film against direct radiation of the glow light at the discharge points of said discharge bar.

6. Apparatus as claimed in claim 5, wherein the glow light at the discharge points of said discharge bar is shielded from direct radiation to the film by means of a metal shield interposed between the said points and said glass.

7. Apparatus as claimed in claim 5, wherein a discharge bar is mounted at either side of the camera case.

8. Apparatus as claimed in claim 5, wherein the discharge bar extends substantially co-extensive with the glass.

9. The method of preventing a static charge from discharging onto a sensitized film passing through a camera which consists in producing a conducting or ionized atmosphere at one side of the usual contact glass of the camera and out of contact with the film and binding the charge by condenser action on the glass so as to prevent it from discharging onto the film.

10. Apparatus for preventing static charge from discharging onto the sensitized film passing through a camera comprising in combination with the usual contact glass over which the film travels, means for producing conducting or ionized atmosphere at the opposite side of the glass from the side over which the film travels and out of contact with the film and binding the charge on the glass by condenser action so as to prevent it from discharging onto the film, and means shielding the film against direct radiation of the glow light emanating at the means for producing said conducting or ionized atmosphere.

11. Apparatus as claimed in claim 10, wherein the means consists of a discharge bar disposed beneath the glass and separated from the film by the glass.

12. Apparatus as claimed in claim 10, wherein the means consists of a pair of discharge bars mounted at opposite sides of the camera case beneath the glass and separated from the film by the glass.

In testimony whereof I affix my signature.

WILLIAM HENRY CHAPMAN.